United States Patent [19]
Chapman

[11] Patent Number: 5,238,331
[45] Date of Patent: Aug. 24, 1993

[54] MODULARIZED MACHINE FOR RECONDITIONING PIPELINES

[75] Inventor: Gordon R. Chapman, Houston, Tex.

[73] Assignee: CRC-Evans Rehabilitation Systems, Inc., Houston, Tex.

[21] Appl. No.: 905,750

[22] Filed: Jun. 29, 1992

Related U.S. Application Data

[62] Division of Ser. No. 646,152, Jan. 25, 1991, Pat. No. 5,136,969.

[51] Int. Cl.⁵ .......................... B05B 13/02; B05C 5/00
[52] U.S. Cl. ................................. 405/303; 118/307; 405/163; 405/158
[58] Field of Search ............... 405/154, 158, 163, 164; 118/305, 306, 307, DIG. 11, DIG. 7; 15/104.04, 88; 134/172, 180, 181; 51/411, 425, 410, 415, 419, 439, 426, 427, 424, 434; 474/153; 74/89.21

[56] References Cited

U.S. PATENT DOCUMENTS

| | | | |
|---|---|---|---|
| 3,717,944 | 2/1973 | Clegg | 37/2 R |
| 4,011,690 | 3/1977 | Braithwaite et al. | 51/319 X |
| 4,068,396 | 1/1978 | Langguth | 37/2 R |
| 4,378,133 | 3/1983 | Trautwein | 474/153 X |
| 5,083,472 | 1/1992 | Kang | 74/89.21 |

FOREIGN PATENT DOCUMENTS

8403428  6/1986  Netherlands .......................... 138/97

Primary Examiner—Dennis L. Taylor
Attorney, Agent, or Firm—Richards, Medlock & Andrews

[57] ABSTRACT

A machine and method are provided for reconditioning pipelines. The machine comprises parts and modules which are easily stowed, manually portable into and out of excavations, and easily installed together to form a machine for reconditioning the outer surface of pipelines. A frame construction capable of assembly around a pipeline is provided. A travel module is attachable to the frame to move the frame along the pipeline. A traction module is attachable to the frame to provide substantially constant traction during travel regardless of surface irregularities. A ring construction is provided for placement around the pipeline and rotation about rollers attachable to the frame that engage the inside of the ring construction. Retaining arms and reconditioning devices can be mounted on the ring construction and a rotating module is attachable to the frame to engage and rotate or oscillate the ring construction around the pipeline.

17 Claims, 6 Drawing Sheets

MODULARIZED MACHINE FOR RECONDITIONING PIPELINES

This application is a division of my co-pending U.S. patent application Ser. No. 07/646,152 filed Jan. 25, 1991 now U.S. Pat. No. 5,136,969.

TECHNICAL FIELD OF THE INVENTION

The invention relates to a pipeline reconditioning machine. In one aspect, it relates to such a machine that can travel along a pipeline while rotating and oscillating reconditioning devices around the pipeline.

BACKGROUND OF THE INVENTION

Reconditioning underground pipelines typically involves removal of existing surface coatings by scraping, sandblasting and/or water blasting, preparation of the pipeline surface by sandblasting and/or water blasting, and the recoating of the surface by painting and/or taping. Reconditioning of underground pipelines is typically done by first digging what is termed a "bellhole" around a small portion of the pipeline. These bellholes typically only expose as little as 18 to 50 feet of pipeline at once in order to reduce stress on the unsupported, exposed pipeline. However, longer segments may be exposed. Once an exposed portion of the pipeline has been reconditioned, it is reburied, or backfilled, and another portion of the pipeline is excavated. This process insures that only a small length of pipeline is unsupported at any one time during the reconditioning operation. Other times reconditioning of underground pipelines is done only at certain places along the length of the pipeline where it is known that repairs are needed.

The nature of these operations is such that reconditioning of an underground pipeline is performed intermittently on short lengths of pipeline. Any machine used to recondition the pipeline in such operations must be repeatedly removed from the excavation to facilitate the continuing backfilling and excavation operations and then installed again in the next excavation.

Present machines for reconditioning pipelines are mostly suited for reconditioning long, continuous runs of pipe. They are either too large or too arduous to install to justify using them intermittently on short lengths of pipeline. Some machines require the use of a side boom or crane to install them on the pipeline; this ties up equipment that can be used elsewhere to backfill or excavate. Other machines require intensive installation operations to secure and adjust the machine around the pipeline for operation. Such machines are inefficient for use in the above type of operations because too much time and expense is used repeatedly removing and installing the machines only for short lengths of pipeline. Other machines are so expensive that their use cannot be justified in situations where a pipeline owner needs only to repair a few places along a pipeline. In such situations manual reconditioning, although slow and of inferior quality, must be used instead.

Reconditioning machines work best when they move at slow continuous speeds along the pipeline. However, during reconditioning operations the existing surface coatings of the pipeline are often uneven and sometimes ripple or bunch up along the pipeline. Also, many pipelines are inclined in the ground. Some of the existing machines do not operate effectively under such conditions because of either a lack of proper traction or lack of any means to compensate for surface irregularities. In some situations, when a ripple or bulge is encountered by the machine, the wheels bind up on the irregularity and the machine is unable to move. In other situations, there is not enough traction between the wheels and the pipeline which causes slipping of the wheel. In either case, the continuous motion of the machine is interrupted and the quality of reconditioning suffers and time is wasted.

There is a need for a machine that can be 1) easily stowed in a van or truck, manually ported into a small excavation, manually installed around a pipeline without the need of a boom or crane, easily adjusted for operation, and then manually ported back out of the excavation and stowed in the van or truck for easy transport to the next excavation and 2) just as easily stowed in its assembled state on a skid that contains the ancillary equipment, such as compressors and blow pots, and then, when ready for use, lowered over a pipeline by a jib crane contained on the same skid. There is also a need for a machine that is inexpensive to manufacture and requires minimal assembly and adjustment steps. There is also a need for such a machine that is capable of any desired reconditioning method whether it be scraping, water blasting, sandblasting, painting, coating or some other method. A need also exists for a reconditioning machine that can operate effectively despite surface irregularities and inclines.

SUMMARY OF THE INVENTION

In accordance with one aspect of the present invention, a modularized machine for reconditioning pipelines is provided. The present invention can be easily stowed in a van or truck, manually ported in and out of bellhole excavations, manually installed around a pipeline and easily adjusted for remote operation. The present invention can also be stowed in its assembled state on the skid that contains the ancillary equipment for operation, and then, when ready for use, lowered over the pipeline by a jib crane also contained on the skid. The present invention can recondition pipelines effectively despite surface irregularities and inclines.

The machine comprises a portable multipart frame construction that is capable of being manually assembled around a pipeline. Attachable to this frame construction is at least one portable travel module, having wheels and motor drive, that is attached to the frame above the center line of the pipeline in order to support and move the frame construction along the pipeline. A portable traction module is also attachable to the frame construction at a point underneath the pipeline to provide approximately constant traction between the travel wheels and the surface of the pipeline regardless of irregularities on the surface of the pipeline. Adjustable roller assemblies are attachable to the frame and can be spaced concentrically around the pipeline. A portable partial ring construction is provided that is capable of being manually positioned over the rollers such that it is concentrically rotatable about the pipeline on the rollers when the rollers are adjusted to engage the inside of the partial ring construction. Also provided is a portable rotating module, having a sprocket and a reversible motor, attachable to the frame construction to engage and rotate the partial ring construction about the rollers. Also provided is at least one retaining arm attachable to the partial ring construction that can retain at least one reconditioning device at a desired position relative to the surface of the pipeline.

In another aspect of the invention, the machine is further provided with a limit switch arrangement that reverses the direction of the reversible motor after the partial ring construction has been rotated through a desired arc.

Another aspect of the invention is the partial ring construction itself for use with a reconditioning machine.

Another aspect of the invention is a method of reconditioning a pipeline by assembling the modularized machine around the pipeline, then simultaneously rotating or oscillating a reconditioning device around the pipeline, moving the frame construction along the pipeline, and supplying the desired reconditioning material through a reconditioning device.

The present invention is inexpensive to manufacture, requires minimal machining, is easy to install, adjust and operate, is manually portable, and easily stowed. The present invention is also stowable in its assembled state on a skid and can easily be lowered over a pipeline by a jib crane on the skid. The present invention also is capable of effective travel and operation along the pipeline despite surface irregularities or inclines. Having the rollers engage the inside of the partial ring construction allows for easy placement and adjustment of the ring construction on the rollers and around the pipeline.

BRIEF DESCRIPTION OF THE DRAWINGS

The present invention will be better understood upon reading the detailed description set forth below in connection with the following drawings wherein.

DETAILED DESCRIPTION

With reference to the accompanying FIGS. 1-10, wherein like reference numerals designate like or corresponding parts throughout the several views, the present invention is explained hereinafter.

Figure 1:
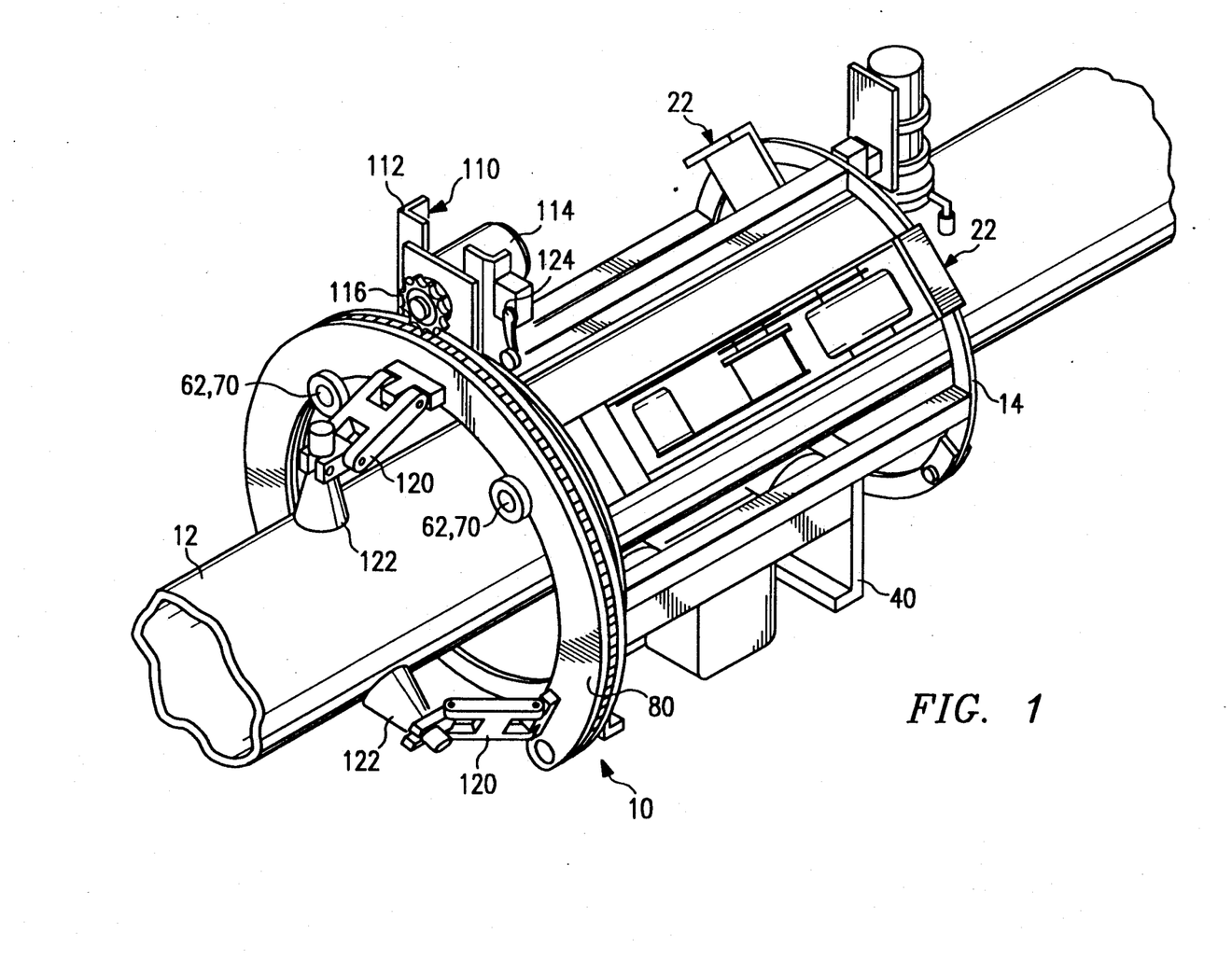
FIG. 1 is a perspective view of a preferred embodiment of the present invention.
Figure 2:
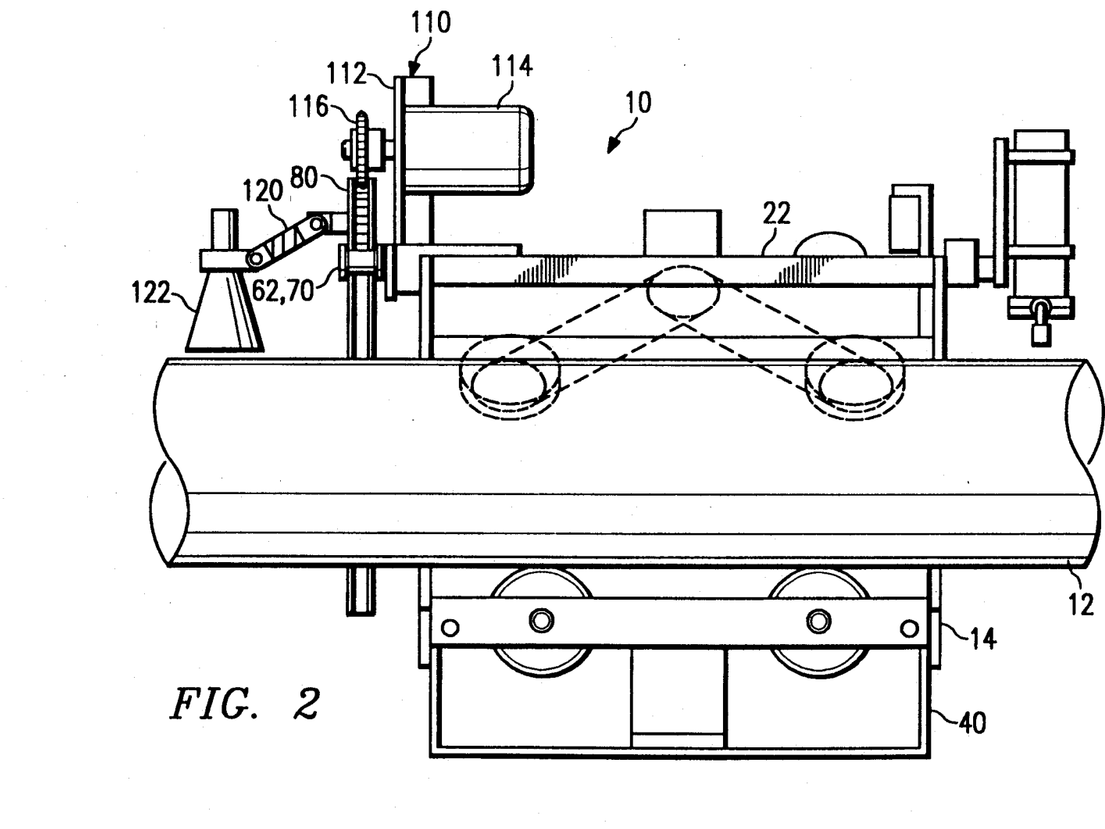
FIG. 2 is a cut-away sideview of the preferred embodiment of the present invention.
Figure 3:
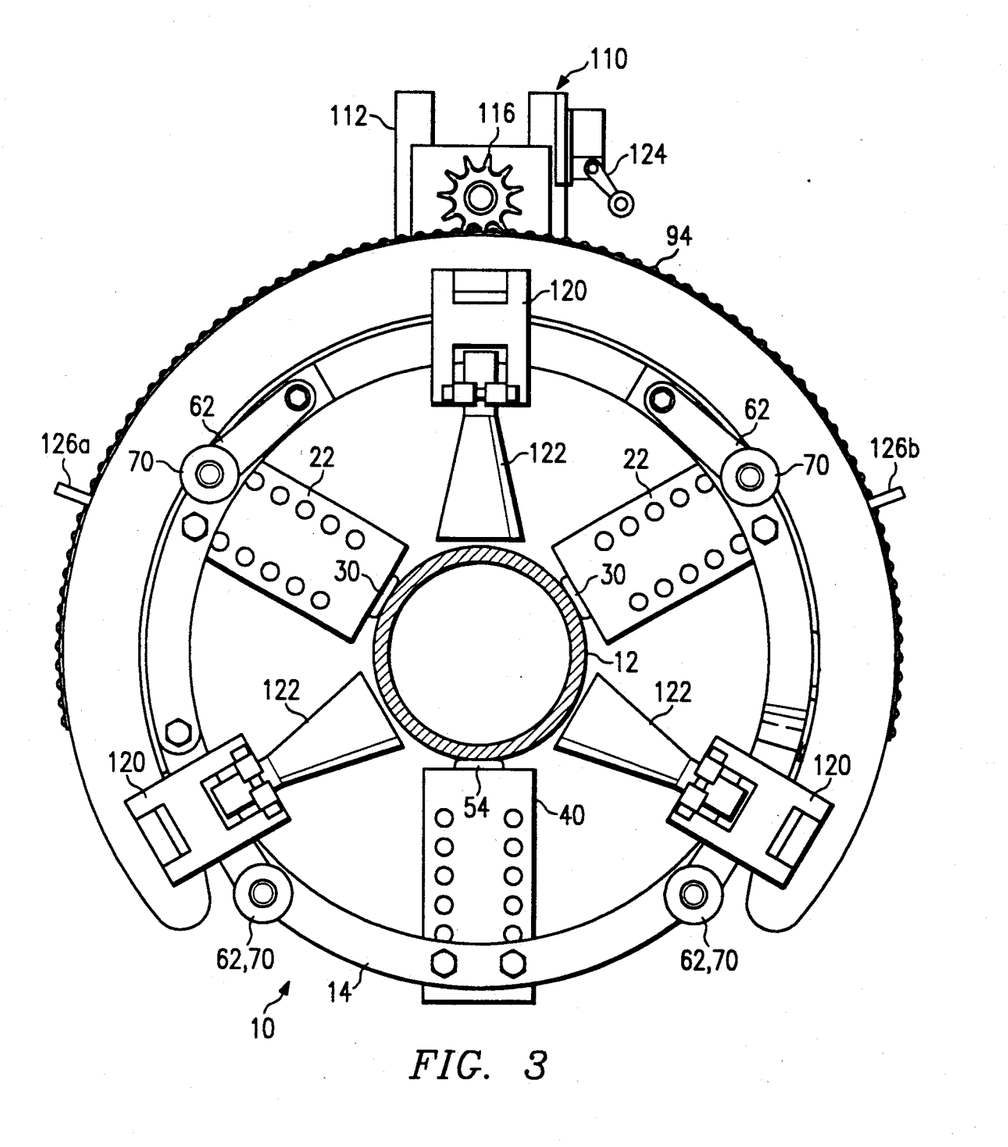
FIG. 3 is a front end view of the preferred embodiment of the present invention.

FIGS. 1, 2 and 3 depict the preferred embodiment of the modularized machine 10 assembled in place around the pipeline 12. The frame construction 14 is composed of multiple parts and the parts can be manually ported to the pipe and assembled around the pipe without requiring the aid of a side boom or crane. Any appropriate method for assembling the frame can be used such as bolting. In the preferred embodiment shown best in FIG. 9 the frame construction has a top part 15 and bottom part 16 that are hinged together at connections 17 on one side and opened and closed on the other side with a hand quick-release arrangement 18. This clam shell opening and closing feature allows easy positioning of the frame 14 around the pipeline 12.

Figure 4:
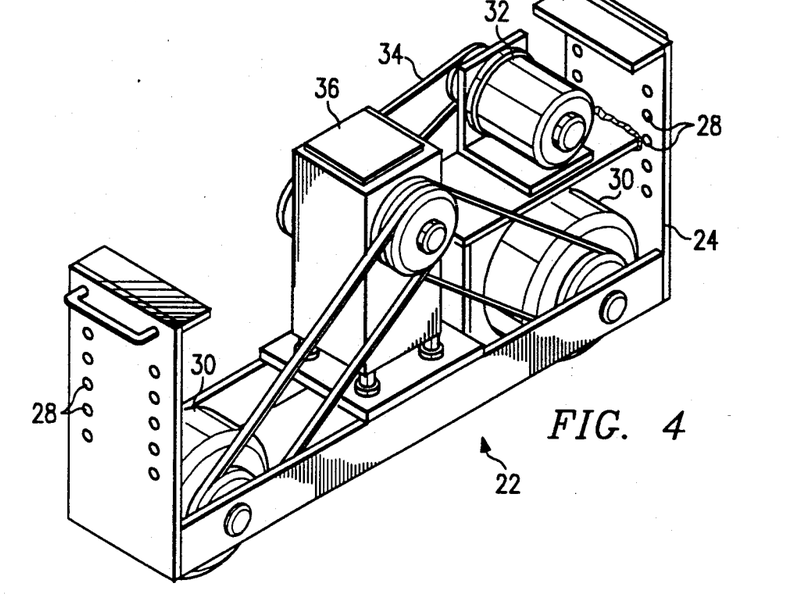
FIG. 4 is a perspective view of the preferred embodiment of the travel module.

The frame 14 is supported on pipeline 12 by travel modules 22. The preferred embodiment employs two travel modules 22 attached to the top of the frame. FIG. 4 depicts the preferred embodiment of the travel module 22. The travel module can be manually portable and installable. In the preferred embodiment, the travel module comprises a plate metal housing 24 with a series of bolt holes 28 on each end that allow for the travel module to be adjustably attached to the frame. At least two travel wheels 30 are mounted on the bottom of the housing. A motor 32 and chain drive 34 rotate gears in gear box 36 which rotate travel wheels 30 which propel frame 14 along pipeline 12. A Char-Lynn motor and a Dayton gearbox can be used as well as other appropriate means to rotate travel wheels 30.

Figure 5:
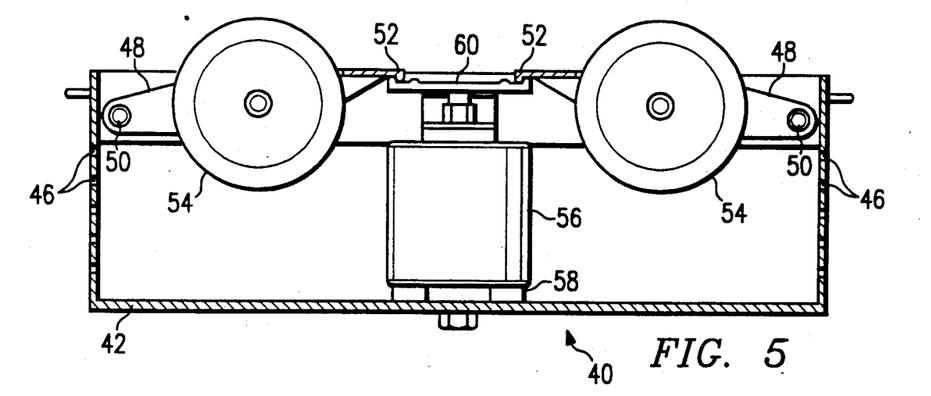
FIG. 5 is a cut-away side view of the preferred embodiment of the traction module.

With reference back to FIGS. 1, 2 and 3, traction between travel wheels 30 and the pipeline surface is provided by traction module 40. The traction module can also be manually portable and installable. FIG. 5 depicts the preferred embodiment of the traction module 40. The traction module comprises a plate metal housing 42 with a series of bolt holes 46 on each end that allow for the traction module to be adjustably attached to the frame 14. Lever arms 48 are pivotally mounted to the housing at connections 50. Idler wheels 54 are attached at a point on the midsection of lever arms 48. An accumulator 56 is mounted in the housing 42 by securing first end 58 of accumulator 56 to housing 42. The second end 60 of accumulator 56 engages the free ends 52 of lever arms 48. Pressurization of accumulator 56 extends second end 60 which rotates free ends 52 about connections 50 thus bearing idler wheels 54 against the surface of the pipeline thus creating additional traction between the travel wheels 30 and the upper surface of pipeline 12. At the same time any surface irregularities encountered by idler wheels 54 or travel wheels 30 are absorbed by accumulator 56 thus providing substantially constant traction to the travel wheels 30 as the frame 14 moves along the pipeline. A Firestone accumulator can be used as well as other appropriate accumulators. Constant pressurization can be provided by compressed air provided via a hose and nozzle attached to the accumulator. An advantage of using an accumulator is that for each different pipeline surface condition a different pressure can be used in the accumulator to create the desired constant traction. Other ways to provide approximately constant traction can be used.

Figure 6:
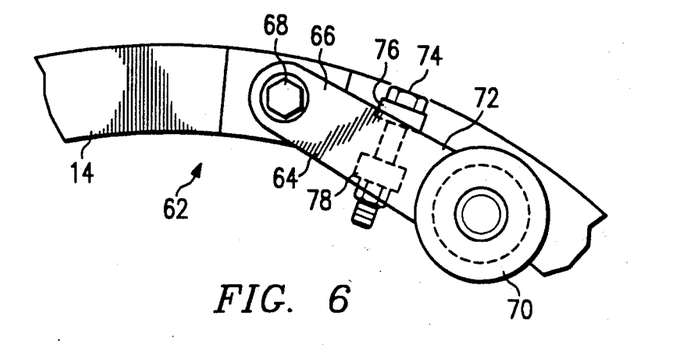
FIG. 6 is a side view of the preferred embodiment of the roller assembly.

With reference back to FIGS. 1, 2 and 3, attachable to the frame construction 14 are preferably four adjustable roller assemblies 62. The roller assemblies 62 can be mounted around the pipeline such that the axes of rotation of the rollers are approximately parallel to the axis of the pipeline. FIG. 6 depicts the preferred embodiment of a roller assembly 62. It comprises a pivot arm 64 with a first end 66 pivotally attached to frame construction 14 at connection 68. A roller 70 is attached to the second end 72 of pivot arm 64. A bolt 74 screws through first lug 76 welded onto frame construction 14 and engages the surface of second lug 78 welded onto pivot arm 64. Thus adjustment of the roller can be accomplished by rotation of bolt 74 which displaces second lug 78 which rotates roller 70 about connection 68.

A surface hardened V-roller with Consolidated bearings #2200-2RS can be used as well as other appropriate roller and bearing combinations. A variety of bolt set adjusting arrangements can be used.

Figure 7:
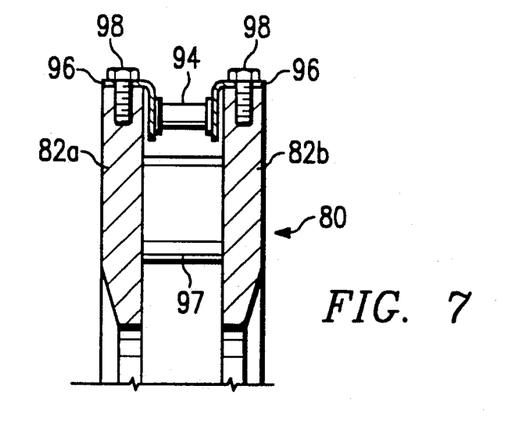
FIG. 7 is a cross-section of the preferred embodiment of the partial ring construction.

With reference back to FIGS. 1, 2 and 3, partial ring construction 80 is mountable about the rollers 70. One factor that contributes to easy installation is the fact that the rollers are on the inside of the ring thus allowing easy, quick placement of the partial ring construction over the bearings and then a quick adjustment of the rollers to properly engage the inside surface. FIG. 7 along with FIGS. 1, 2 and 3 depict the preferred embodiment of partial ring construction 80. In the preferred embodiment partial ring construction 80 comprises top arcuate members 82a and 82b. The arcuate members 82a, b are attached side by side to each other by a length of chain 94 with outward extending lugs 96 that are attachable about the periphery of arcuate members 82a, b by connectors 98 screwing through lugs 96 into arcuate members 82 a, b. A #50 type roller chain with attachments can be used as well as other appropriate chains. Spacers 97 are placed at various points along the ring construction.

The inner diameter of the ring construction 80 is approximately that of a circle tangentially described about rollers 70. The rollers 70 can be adjusted to allow for easy placement of partial ring construction 80 over the rollers 70. After placement the rollers 70 can be quickly adjusted to a desired tension with the inside surface of partial ring construction 80.

Figure 8:
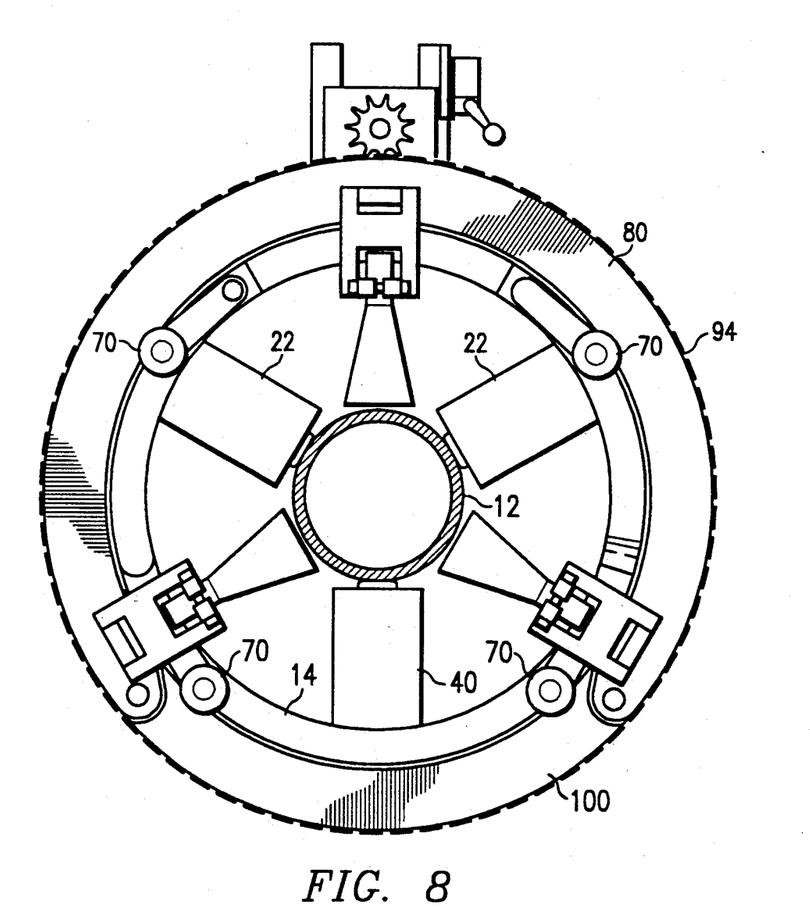
FIG. 8 is an end view of the present invention showing an alternative embodiment of the ring construction.

In an alternative embodiment depicted in FIG. 8, the partial ring construction 80 can have ring completion section 100 added to make the ring construction 360° complete around the pipeline. The ring completion section 100 is built just like the partial ring construction and after it is attached there is chain continuous around the periphery such that the complete ring construction can be continuously rotated in one direction. This completion section 100 is especially useful in taping or scraping applications which require unidirectional rotation.

With reference back to FIGS. 1, 2 and 3, rotating module 110 attaches to the frame and engages and rotates the ring construction 80 around pipeline 12. The preferred embodiment of the rotating module 110 comprises plate metal bracket 112 adjustably attachable to frame construction 14. A reversible motor 114 and sprocket 116 assembly can be mounted on the bracket 112 such that sprocket 116 engages chain 94. Reversible motor 114 rotates sprocket 116 which rotates chain 94 thereby rotating partial ring construction 80 about pipeline 12. A Martin sprocket with a Char-Lynn motor can be used as well as other suitable sprocket/motor combinations.

At least one retaining arm 120 can be attached to ring construction 80. The preferred embodiment of retaining arm 120 comprises a three part pivoting linkage to facilitate adjusting any reconditioning devices to the desired position relative to the pipeline surface. Any other suitable clamp can also be used to attach to the ring construction to serve as a retaining device.

When reconditioning is ready to begin at least one reconditioning device 122 as depicted in FIGS. 1, 2 and 3 can be mounted in retaining arm 120. Any combination of reconditioning device 122 and retaining arm 120 attachable to the ring construction can be used. Applicator devices include scrapers, water nozzles such as a Hammelmann RD1500 spin jet, sandblast nozzles such as a Kelco #5, paint nozzles such as a EHA 517, paint brushes or rollers such as a Titan 310-085 and tape applicators such as a Remco Wrapster. For sand, water and paint, a supply hose can then be connected to the nozzle and run to the material supply located outside of the excavation.

Another aspect of the invention provides for the above described machine further comprising a limit switch arrangement as depicted in FIG. 3. Switch 124 can be attached to bracket 112. Switch 124 reverses the direction of reversible motor 114 when contacted. Tabs 126a and 126b can be attached to ring construction 80 such that they contact switch 124 when they are rotated to switch 124. Thus every time tab 126a or b is rotated to and contacts switch 124 the direction of rotation of the ring construction can be reversed. Without this limit switch arrangement the direction of reversible motor 114 can be changed remotely by the operator of the machine.

The preferred embodiment has one switch 124 mounted on bracket 112 so no installation of any switch on frame 14 is required. The arc of rotation is adjusted by having two tabs 126 a and b mounted on ring construction 80 at the desired arc of oscillation. However, more than one switch 124 can be used to control the arc of oscillation of the ring construction. Oscillation is needed where hoses supplying water, sand or paint would entangle and prevent one direction rotation. Oscillation as well as one direction rotation can be used for scraping and tape applications.

An example arrangement is where three nozzles are mounted equally spaced on ring construction 80. Two tabs are mounted on ring construction 80 about 125° apart. Thus the arc of oscillation is 125° and the three nozzles 120° apart cover the entire circumference of pipeline 12 with a little overlap when the ring construction is oscillated through the 125° arc. An infinite amount of arrangements can be used. Factors such as amount of water pressure and desired pipeline finish will influence the arrangement used.

Figure 9:
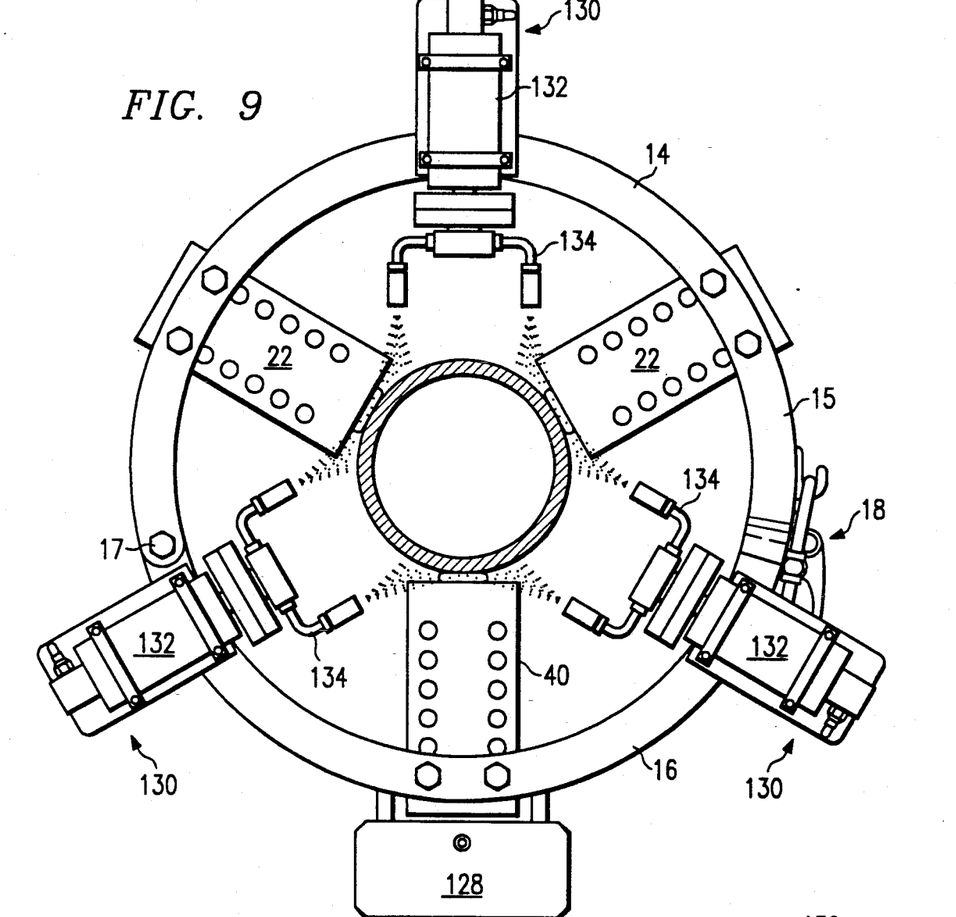
FIG. 9 is a back end view of an alternative embodiment showing the water nozzle assemblies arranged on the frame construction.

Alternative feature of the present invention comprises a tank 128 shown in FIG. 9 that can be mounted on the bottom of frame construction 14 and then filled to ballast the modularized machine 10 during operation.

Another aspect of the present invention is solely the partial ring construction 80 as described above in the preferred embodiment. Ring construction 80 can be used with the present machine 10 or any other suitable reconditioning machine. The ring completion section 100 can also be added when unidirectional rotation is desired.

Figure 10:
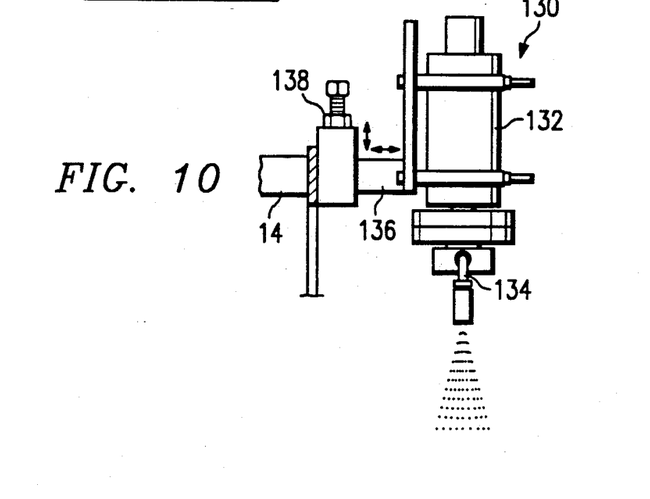
FIG. 10 is a detail view showing an alternative embodiment of the mounting of the water nozzle assemblies.

With reference to FIGS. 9 and 10, another aspect of the invention is the machine 10 as described above further comprising water nozzle assemblies 130 that can be mounted on the end of frame 14 opposite the end where the ring construction is attached. The preferred embodiment of water nozzle assemblies 130 comprises nozzle 132 with a spinning spray bar 134. A Hammelmann rotary joint #00.0062.0086 complete with spray bars and nozzles can be used as well as any other suitable nozzle. These assemblies can be mounted around the pipeline such that the entire circumference of the pipeline can be impinged by water. Rotation of the spinning spray bars 134 can be accomplished by slightly angling one end of the spinning spray bar 134 such that it is self-rotating when water is pumped through it to impinge pipeline 12.

In the preferred embodiment the water nozzle assemblies can be mounted as seen in FIG. 10, to a telescoping member 136 that telescopes in and out of frame construction 14. A set screw type of arrangement 138 can be used to fix the telescoping member 136 at the desired position. This allows water nozzles mounted on such members to be adjusted to a different distance from the frame construction than adjacent water nozzles. This allows an overlapping of spray area from adjacent nozzles while avoiding possible contact between spinning spray bars of adjacent water nozzles.

The telescoping member 136 is also capable of lateral adjustment by set screw arrangement 138 so that the water nozzle assemblies can be quickly moved closer or farther from the pipe 12. The telescoping member also has additional bolt holes to allow even further adjustment of the water nozzle assemblies. All these adjustment features allow for the use of different length spray bars and for the use of nozzles 130 on different diameter pipelines.

In an alternative embodiment one or more of water nozzle assemblies 130 can be attached to ring construction 80 and then can be oscillated through a desired arc.

Any alternative use and arrangement of the water nozzle assemblies is to mount three nozzles on half of the frame and travel down the pipe and cleaning one half of the pipe then return with the nozzles mounted on the other half of the machine to clean the other half of the pipe. This can be advantageous where a large diameter pipe is being cleaned and there is limited water pressure capacity.

An alternative embodiment of the machine 10 provides for a ring construction 80 on each end of frame 14 thus two different reconditioning steps can be performed simultaneously.

Operation of the machine 10 after assembly is completed, can be conducted from a skid outside of the excavation. The skid contains all the ancillary equipment such as compressors and blow pots. Any hydraulic and electrical connections, and supply hoses for water or sand can be run from the skid to the machine and suitably connected. Hoses to supply water, sand or paint to be used during oscillation need to have sufficient slack.

The machine 10 can be stored in its assembled state on the skid with the equipment and lowered over and removed from a pipeline by a small jib crane also on the skid.

Another aspect of the present invention provides a method for reconditioning the outer surface of a pipeline comprising the steps of manually placing a frame construction with attached rollers around the pipeline; mounting at least one travel module to the frame at a point above the center line of the pipeline to support and move the frame construction on the pipeline; mounting a traction module to the frame underneath the pipeline to provide constant traction between the wheels of the travel module and the pipeline as the frame construction travels along the pipeline regardless of irregularities along the surface of the pipeline; placing a partial ring construction about the rollers; adjusting the rollers to engage the inside diameter of the partial ring construction; mounting a rotating module to said frame construction to engage and rotate the ring construction; mounting an applicator device onto the ring construction; and then simultaneously rotating or oscillating the ring construction around the pipeline, moving the frame construction along the pipeline and supplying the desired reconditioning material through the applicator device.

The machine 10 and its operation has been discussed in relation to reconditioning an exposed length of pipeline that is still intact in the ground. It should be realized that machine 10 can be used on above ground pipe, heat exchangers and other cylindrical bodies, and can be used in a shop environment as well as out in the field.

While some embodiments of the present invention have been illustrated in the accompanying drawings, and described in the foregoing Detailed Description, it will be understood that the invention is not limited to the embodiments disclosed, but is capable of numerous rearrangements, modifications and substitutions of parts and elements without departing from the spirit of the invention.

I claim:

1. A partial ring construction for use with a pipeline reconditioning machine that is positionable about a pipeline, comprising two first arcuate members attached side to side by a first length of chain that has an engageable portion along its length and a first plurality of outwardly extending lugs along each side of the engageable portion that are attached to the periphery of said two first arcuate members such that a gap remains between said two first arcuate members where a plurality of spacers are placed and the engageable portion of said first length of chain bridges said gap, said partial ring construction having an inner radius greater than the radius of the pipeline, and having a periphery of anywhere from about 180° up to less than 360° enough to allow for placement of said partial ring construction over the pipeline.

2. The partial ring construction of claim 1 further comprising a ring completion section attachable to said partial ring construction such that a complete circular ring is formed that is capable of being rotated in one direction continuously.

3. The partial ring construction of claim 2 wherein said ring completion section comprises two second arcuate members attached side to side by a second length of chain that has an engageable portion along its length and a second plurality of outwardly extending lugs along each side of the engageable portion that are attached to the periphery of said two second arcuate members such that a gap remains between said two second arcuate members where a plurality of spacers are placed and the engageable portion of said second length of chain bridges said gap.

4. A ring construction adapted for use on a pipe conditioning machine, wherein the pipe conditioning machine has a plurality of rollers with parallel axes of rotation and arranged such that a circle can be described tangentially around the plurality of rollers, the pipe conditioning machine further has a sprocket with an axis of rotation parallel to the axes of rotation of the plurality of rollers, the sprocket being located radially outwardly of the plurality of rollers, said ring construction comprising:

(a) two arcuate members positioned side to side, each of greater than 180° and having an inside arcuate surface facing radially inwardly with a radius approximately that of the circle describable around the plurality of rollers, each of said arcuate members further having an outside arcuate surface facing radially outwardly;

(b) a drive chain disposed between the two arcuate members such that a gap is defined between the two arcuate members, the chain fixed along said outside arcuate surfaces of each arcuate member so as to be disposed along said gap such that the sprocket tangentially engages said drive chain over said gap, and so that said ring construction can be rotated about its center axis by rotative movement of the sprocket when said inside arcuate surface of said ring construction is disposed on the plurality of rollers.

5. A ring construction in accordance with claim 4 further comprising a first plurality of lugs extending from one side of said drive chain and attached to one of said two arcuate members and a second plurality of lugs extending from the other side of said drive chain and attached to the other of said two arcuate members.

6. A ring construction in accordance with claim 5 wherein said drive chain extends along the entire length of said outside arcuate surface.

7. A ring construction in accordance with claim 6 further comprising an arcuate ring completion section attachable to said arcuate members to form a complete circular ring that is capable of being continuously rotated in one direction by the sprocket.

8. A rotatable ring construction assembly, comprising:
(a) a frame;
(b) a plurality of rollers attached to the frame, said plurality of rollers having parallel axes of rotation and arranged such that a circle can be described tangentially around the plurality of rollers;
(c) two arcuate members positioned side to side, each of greater than 180° rotatably disposed about said plurality of rollers, each of said arcuate members having an inside arcuate surface facing radially inwardly and contacting said plurality of rollers and having an outside arcuate surface;
(d) a drive chain disposed between the two arcuate members such that a gap is defined between the two arcuate members, the chain fixed along said outside arcuate surfaces so as to be disposed along said gap such that said sprocket tangentially engages said drive chain over said gap.

9. An assembly in accordance with claim 8 further comprising a sprocket and motor assembly attached to said frame such that said motor rotates said sprocket, the rotational axis of said sprocket is parallel with the rotational axes of said plurality of rollers, and said sprocket tangentially engages said drive chain.

10. An assembly in accordance with claim 9 further comprising a limit switch mechanism attached to the frame so as to reverse the direction of rotation of said sprocket when said arcuate members have rotated to a predetermined position such that the arcuate members can be oscillated through a desired arc.

11. An assembly in accordance with claim 8 further comprising a first plurality of lugs extending from one side of said drive chain and attached to one of said two arcuate members and a second plurality of lugs extending from the other side of said drive chain and attached to the other of said two arcuate members.

12. An assembly in accordance with claim 11 wherein said drive chain extends along the entire length of said outside arcuate surface.

13. An assembly in accordance with claim 12 further comprising an arcuate ring completion section attachable to said arcuate members to form a complete circular ring that is capable of being continuously rotated in one direction by said sprocket.

14. An apparatus, comprising:
(a) two arcuate members positioned side to side of greater than 180° each having an inside arcuate surface facing radially inward, said inside arcuate surface having a constant radius, each of said arcuate members further having an outside arcuate surface;
(b) a drive chain, having an engageable portion along its length, disposed between the two arcuate members such that a gap is defined between the two arcuate members, the chain fixed along said outside arcuate surfaces arcuately parallel with said inside arcuate surface and oriented so that said engageable portion faces radially outwardly and is disposed over the gap.

15. An apparatus in accordance with claim 14 further comprising a first plurality of lugs extending from one side of said drive chain and attached to one of said two arcuate members and a second plurality of lugs extending from the other side of said drive chain and attached to the other of said two arcuate members.

16. An apparatus in accordance with claim 15 wherein said drive chain extends along the entire length of said outside arcuate surface.

17. An apparatus in accordance with claim 16 further comprising an arcuate ring completion section attachable to said arcuate members to form a complete circular ring.

* * * * *